United States Patent [19]

Funderburk et al.

[11] Patent Number: 4,493,872

[45] Date of Patent: Jan. 15, 1985

[54] POLYESTER FILM COATED WITH METAL ADHESION PROMOTING COPOLYESTER

[75] Inventors: F. Gene Funderburk, Taylors; E. C. Culbertson, Greer; Robert G. Posey, Taylors, all of S.C.

[73] Assignee: American Hoechst Corporation, Somerville, N.Y.

[21] Appl. No.: 558,126

[22] Filed: Dec. 5, 1983

[51] Int. Cl.³ .................. B32B 15/08; B32B 27/08; B32B 27/36

[52] U.S. Cl. .................. 428/332; 427/250; 428/334; 428/336; 428/412; 428/458; 428/475.5; 428/480; 428/483

[58] Field of Search ............ 428/483, 480, 332, 334, 428/335, 336, 412, 458, 475.5; 264/134; 430/160, 532, 533, 535; 524/602; 528/295; 427/250

[56] References Cited

U.S. PATENT DOCUMENTS

| | | | |
|---|---|---|---|
| 2,627,088 | 2/1953 | Alles et al. | 264/134 |
| 2,698,240 | 12/1954 | Alles et al. | 430/535 |
| 3,563,942 | 2/1971 | Heiberger | 524/602 |
| 3,779,993 | 12/1973 | Kibler et al. | 528/295 |
| 4,181,528 | 1/1980 | Work et al. | 430/533 X |
| 4,214,035 | 7/1980 | Heberger | 428/483 |
| 4,252,885 | 2/1981 | McGrail et al. | 430/160 |
| 4,340,519 | 7/1982 | Kotera et al. | 428/480 X |
| 4,394,442 | 7/1983 | Miller | 430/532 |

FOREIGN PATENT DOCUMENTS

| | | | |
|---|---|---|---|
| 0023389 | 2/1981 | European Pat. Off. | 428/461 |
| 0029620 | 6/1981 | European Pat. Off. | 430/160 |
| 1249015 | 10/1971 | United Kingdom | 428/483 |
| 1370893 | 10/1974 | United Kingdom | 428/458 |

Primary Examiner—Thomas J. Herbert
Attorney, Agent, or Firm—James R. Cartiglia

[57] ABSTRACT

A coated, oriented plastic film material is provided wherein the coating is applied in an aqueous medium comprising a water dispersible copolyester consisting essentially of the condensation product of components A, B, C and D or their polyester forming equivalents as follows:

(A) about 65 to 95 mole percent of isophthalic acid;
(B) about 0 to 30 mole percent of at least one aliphatic dicarboxylic acid of the formula $HOOC(CH_2)_nCOOH$, wherein n ranges from about 1–11;
(C) about 5 to about 15 mole percent of at least one sulfomonomer containing an alkali metal sulfonate group attached to a dicarboxylic aromatic nucleus, and
(D) stoichiometric quantities of about 100 mole percent of at least one copolymerizable aliphatic or cycloaliphatic alkylene glycol having about from 2 to 11 carbon atoms.

The copolyester coating layer may be applied to the film, e.g., polyester film, at any suitable stage during manufacture of the film, i.e., before, during, or after the stretching operations. The resultant coated polyester film is found to provide excellent adhesion to metallic coatings subsequently applied thereto by metallizing techniques.

26 Claims, No Drawings

POLYESTER FILM COATED WITH METAL ADHESION PROMOTING COPOLYESTER

SUMMARY OF THE INVENTION

The present invention relates to oriented plastic, e.g. polyester film coated on one or both sides with a copolyester primer coating comprising isophthalic acid, a sulfonated aromatic dicarboxylic acid and a diol in order to increase the adhesive properties of the polyester film to metals applied by vapor deposition techniques.

BACKGROUND OF THE INVENTION

Oriented plastic film, particularly biaxially oriented film composed of polyethylene terephthalate (PET), is widely used as a packaging material for a variety of products, including foodstuffs.

In many instances plastic film coated with a metal has replaced metallic foils, such as aluminum foil, for end uses such as labels and decals, solar window film, packaging films, decorative products and microfilm. Among other uses, the metallic foils serve to hinder the onset of oxidative rancidity of the products either prepared in or served with certain edible oils by preventing the passage of visible and ultraviolet light. PET, when coated with a thin metallic layer, provides a strong, flexible packaging material with the desirable oxygen and moisture barrier properties common to PET packaging applications, along with the visible and ultraviolet light barrier properties common to metallic foil packaging applications at a greatly reduced cost. Unfortunately, the metal to film bond can fail in many applications due to the flexibility of a plastic film substrate layer, thereby causing the metal to be removed from the film.

One approach for improving the adhesion of the metal to PET film is to heat the coated film as disclosed in British Pat. No. 1,370,893. The drawback to this method is the experimentation which must be performed in order to determine the proper temperature and time elements for this procedure before any metallized film may be produced. Another approach has been to coat polyester film with a layer comprising a random copolymer of ethylene with from 0.5 to 15 weight percent of a 3 to 6 carbon alpha-mono-olefin as disclosed in European Publication No. 0,023,389. Although PET films with this type of coating display a certain improvement in metal adhesion over uncoated PET, they also display an undesirable coating pattern. For a discussion of the possible mechanisms of metal adhesion to polymer surfaces, see:

(1) Burkstrand, J. M., "Chemical Interactions at Polymer Metal Interfaces and Correlations with Adhesion," Fifth Annual Meeting of the Adhesion Society, Mobile, Ala., Feb. 22-24, 1982; Published by the Adhesion Society, Mobile, Ala., 1982, pp 10a-10c;

(2) Burkstrand, J. M., "Metal-Polymer Interfaces: Adhesion and X-ray Photoemission Studies," Journal of Applied Physics, Volume 52, No. 7, July 1981, 4795-4800; and (3) Burkstrand, M. J., "Hot Atom Interactions with Polymer Surfaces," Journal of Vacuum Science and Technology, 21(1), May/June, 1982, 70-73.

It is known to provide polyester or copolyester coatings derived from sulfoisophthalic acid as in U.S. Pat. No. 4,252,885 or coatings composed of from 20 to 60 molar percent of isophthalic acid, from 6 to 10 molar percent of sulfoisophthalic acid and the remainder terephthalic acid as in European Publication No. 0,029,620. Both of these prior art disclosures, though, are addressed to the production of photographic films.

It is also known to provide an aqueous dispersion of a polymer composed of terephthalic and/or isophthalic acid, a saturated aliphatic dicarboxylic acid such as sebacic acid, and from about 0.5 to about 2.5 molar percent of a sulfomonomer such as sodium 5-sulfoisophthalic acid with a di- or tri-glycol as in U.S. Pat. No. 3,563,942. Similar materials are also disclosed in U.S. Pat. No. 3,779,993 and are taught as being useful as hot melt adhesives. Each of these patents teaches the use of such copolyesters as adhesives for various substrates such as paper, metal and plastic film, and broadly suggest the construction of laminates of various plastic, paper and metal layers using the copolyesters as bonding agents. However, neither patent discloses specific copolyester formulations which provide surprisingly enhanced adhesion to plastic film substrates of metal applied by a metallizing technique.

Accordingly, it is an object of this invention to provide an oriented self-supporting plastic film material having enhanced adhesion to metal applied by a metallizing technique.

Another object of this invention is to provide a coating material for biaxially oriented polyethylene terephthalate film material which renders film more adhesive to coatings applied by a metallizing technique.

A further object of this invention is to provide a metallized plastic film of enhanced quality suitable for packaging and solar applications.

DETAILED DESCRIPTION OF THE INVENTION

Plastic film bases which may be prime coated to provide enhanced metal adhesion in accordance with this invention include well known oriented films such as polyester, polyamides, polyolefins such as crystallizable polypropylene and polyethylene, polycarbonates, polysulfones and similar well known materials. The invention will be illustrated using polyester as the film base, specifically polyethylene terephthalate, but the invention is equally applicable to polyester film based on a crystallizable polymer resulting from the polycondensation of a glycol such as ethylene glycol or butane diol and mixtures thereof with terephthalic acid and other dicarboxylic acids such as isophthalic acid, diphenic acid and sebacic acid, or their polyester forming equivalents, which polyesters are made by methods well known in the art. The film may be produced by techniques also well known in the art using well known apparatus. For example, a polyester is melted and extruded as an amorphous sheet onto a polished revolving casting drum to form a cast sheet of the polymer. Thereafter, the film is axially stretched in one direction, either in the direction of extrusion (longitudinal), or perpendicular to the direction of extrusion (transverse) in the case of monoaxially oriented film, and in two directions in the case of biaxially oriented film, that is, the film is stretched in both the longitudinal and transverse directions. The first stretching step of the cast sheet may be in either of these two orthogonal directions. The amount of stretching, to impart strength and toughness to the film, can range from about 3.0 to about 5.0 times the original cast sheet dimension in one or both directions. Preferably, the amount of stretching is in the range of between about 3.2 and 4.2 times the original dimension. The stretching operations are carried out at temperatures in the range of from about the second order transition temperature to below the temperature at which the polymer softens and melts.

Where necessary, the film is heat treated, after stretching, for a period of time necessary to crystallize the polyester film. Crystallization imparts stability and good tensile properties of the film. When polyethylene terephthalate is heat treated, it is subjected to a temperature in the range of between about 190° C. and 240° C. and, more preferably, in the range of between about 215° C. and 235° C.

The copolyester coating of this invention in the form of an aqueous dispersion may be applied in-line at any stage during the film manufacture: the pre-draw stage at the point between the casting of the amorphous sheet and the first stretch such as disclosed, for example, in British Pat. No. 1,411,564 or the inter-draw stage subsequent to the uniaxial drawing but prior to biaxial drawing such as disclosed, for example, in U.S. Pat. No. 4,214,035. Normally the heat applied to the film during the stretching or final conditioning stages is sufficient to evaporate off the water and other volatiles and dry the coating. The coating may also be applied off-line subsequent to the stretching operations to the finished biaxially oriented film. Such application necessitates a separate drying step.

In one preferred embodiment, the coating is applied after the film is uniaxially stretched, that is, after the film is stretched in one direction, but before the film is stretched in the orthogonal direction. In another preferred embodiment, the polyester film is first stretched in the longitudinal direction prior to coating. In this preferred embodiment, prior to longitudinal stretching, the film is coated by any of the well known techniques employed in the art. For example, coating may be effected by roller coating, spray coating, slot coating or immersion coating. In a preferred embodiment, the polyester film is coated by means of gravure roller coating. Also, the uniaxially drawn film is preferably subjected to a corona discharge by a corona discharge apparatus prior to coating, as is known in the art. The discharge treatment decreases the hydrophobic character of the polyester film surface, which permits the water based coating to more easily wet the surface and thus improve the adhesion of the copolyester coating to the surface. During stretching and/or heat setting, the copolyester coating is exposed to temperatures above its melting point and is therefore leveled.

As indicated above, the coating copolyesters of the invention are produced by polycondensing (A) isophthalic acid, (B) an aliphatic dicarboxylic acid having the formula $HOOC(CH_2)_nCOOH$, n being 1-11; (C) a sulfomonomer containing an alkali metal sulfonate group attached to a difunctional dicarboxylic aromatic nucleus, and (D) at least one aliphatic or cycloaliphatic alkylene glycol having from about 2 to 11 carbon atoms. The total acid equivalents present should be substantially equal to the total glycol equivalents on a molar basis.

Examples of dicarboxylic acids suitable as components (B) of the copolyesters include malonic, adipic, azelaic, glutaric, sebacic, suberic, succinic, brassylic acids and mixtures thereof, or their polyester forming equivalents. Sebacic acid is the preferred of such acids.

Examples of sulfomonomers containing a metal sulfonate group attached to a dicarboxylic aromatic nucleus (Component C) are those materials generally represented by the formula:

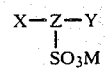

wherein:
M is a monovalent cation of an alkali metal;
Z is a trivalent aromatic radical; and
X and Y are carboxyl groups or polyester forming equivalents.

Such monomers are disclosed in U.S. Pat. Nos. 3,563,942 and 3,779,993, incorporated herein by reference. Species of such monomers include sodium sulfoterephthalic acid; sodium 5-sulfoisophthalic acid; sodium sulfophthalic acid; 5-(p-sodiosulfophenoxy)-isophthalic acid; 5-(sulfopropoxy) isophthalic acid, sodium salt; and like materials as well as their polyester forming equivalents, such as the dimethyl esters. Preferably M is $Na^+$, $Li^+$ or $K^+$.

The term "polyester forming equivalents" as used herein means reactants having groups capable of undergoing condensation reactions to form polyester linkages, which groups include carboxylic groups as well as lower alkyl esters thereof, e.g., dimethyl terephthalate, diethyl terephthalate and many other corresponding esters, halides or salts. It is preferred to employ the acid monomers as the dimethyl esters as this facilitates better control of the condensation reaction.

Examples of glycols suitable as component D include ethylene glycol; 1,5-pentanediol; 1,6-hexanediol; neopentyl glycol; 1,10-decanediol; cyclohexane dimethanol; and similar materials. Ethylene glycol is the much preferred glycol.

The copolyesters may be prepared by well known polymerization means. The general procedure is to combine the acid components with glycol and heat in the presence of an esterification catalyst, with the subsequent addition of a polycondensation catalyst.

It has been found that the relative proportions of the components (A), (B), (C), and (D) which are employed in making the polyester primers of this invention are critical to achieving a primed film offering satisfactory adhesion to metal applied using metallizing techniques. Also, the identity of these components is critical and thus the term "consisting essentially of" is meant to exclude from the composition those monomeric materials in amounts significant enough to seriously detract from the adhesion properties of the primer to applied metals. For example, isophthalic acid (component A) must be present at least about 65 mole percent on the acid side. Also, the presence of more than about 15 mole percent of another aromatic acid such as terephthalic acid, has been found to detract from the adhesion of the primer to metallic coatings. Ideally component (A) is relatively pure isophthalic acid present at a target level of about 70 to about 95 mole percent.

As to optimal component (B), any acid within the formula set forth above will provide satisfactory results, with the preferred acids being adipic, azelaic, sebacic, malonic, succinic, glutaric and mixtures thereof. The target level within the range set forth is about 1 to about 20 mole percent on the acid side when component (B) is present in the composition.

With regard to component (C), the lower limit of about 5 mole percent of this monomer is required in this system to impart water dispersibility to the primer. The preferred range for this material is about 6.5 to about 12 mole percent.

On the glycol side, this material is present in approximately stoichiometric quantities.

The copolyester coatings suitable for the purpose of this invention may be further characterized as having an acid number of less than 10, preferably from about 0 to about 3, a number average molecular weight of less than about 50,000, and an RV (relative viscosity measured as a 1 percent solution in dichloroacetic acid at 25° C. using an Ubbelohde Capillary Viscometer) within the range of about 30 to 700, more preferably in the range of about 350 to 650.

As indicated above, the primer coating of the present invention is applied to the base film as an aqueous dispersion and at a solids concentration within the range of about 0.5 to 15 percent, preferably about 3 to 10 percent. The preferred solids level is such as to yield final dry coating thickness within the range of about $10^{-7}$ to about $10^{-5}$ inch, which translates into a solids level on a weight basis of from 0.00305 g/m$^2$ to 0.305 g/m$^2$. The preferred thickness range of the dried copolyester primer is from $8.0 \times 10^{-7}$ to $2.0 \times 10^{-6}$ inch, with $1 \times 10^{-6}$ inch being the target thickness.

The coating may be applied to one or both sides of the film, or it may be applied to one side and different coatings such as a thermosetting acrylic or methacrylic coating, applied to the opposite side, such as taught in U.S. Pat. No. 4,214,035. In some cases, it may be desirable to include a hardening agent in the copolyester coating formulation, e.g., from about 1-20 percent by weight of a melamine or urea/formaldehyde condensation product, to further modify the properties of the primer coating. Other additives known in the art may also be present in the coating formulation such as anti-static agents, wetting agents, surfactants, pH regulating agents, anti-oxidants, dyes, pigments, slip agents such as colloidal silica, and the like.

The copolyester coatings of this invention exhibit excellent heat stability and, accordingly, any scrap coated film made during production can be mixed with fresh polymer, e.g. polyester polymer, re-melted and re-fed to the film-forming extruder to produce oriented film. Such films produced containing up to about 70 percent by weight of coated scrap reclaim exhibit good quality, color and appearance with very little if any perceptible degradation of properties due to the presence of the coating impurity. Thus the coated film of the invention offers a distinct commercial advantage to the film manufacturer over many other coated films, such as films coated with vinylidene chloride-containing polymers as disclosed in U.S. Pat. Nos. 2,627,088 and 2,698,240, which tend to degrade and discolor when reclaimed as set forth above.

Plastic film, e.g., polyester film, coated with the copolyester composition of this invention has excellent utility as a base for the production of metallized polyester films. Such films are prepared by well known prior art techniques such as by forming a coating on a surface of the coated polyester film of a metal by directing a stream of metal vapor or atoms onto the surface of the film by a vacuum deposition technique. This is effected by heating the metal in a high vacuum, preferably in the range of about $10^{-3}$ to about $10^{-5}$ torr, to a temperature above its melting point such that the vapor pressure of the metal exceeds about $10^{-2}$ torr or it is effected by subjecting the metal to a stream of bombarding ions whereby the metal is removed by mass transfer "sputtering". When these conditions are achieved, the metal is vaporized or sputtered, emitting metal vapor or atoms in all directions. These vapors or atoms impinge on the film surface, condense and thereby form a thin metallic coating on the film. Metals applicable to this process are zinc, nickel, silver, copper, gold, indium, tin, stainless steel, chromium, titanium and, most preferably, aluminum, and include also the oxides of such metals. The thickness of the applied metal coating is a matter of preference depending upon the final use of the metallized film. Thicknesses for aluminum in packaging applications range from about 300 to 600 angstroms, while thicknesses in solar applications are generally less than 100 angstroms.

A major application of the metal coated film of this invention is as a packaging or label material. The side of the film not coated with the metal may be coated with a heat sealable material such as is disclosed in British Pat. No. 1,249,015 or a moisture barrier coating based on polymerized vinylidene chloride copolymers and the metallized side may be printed on with certain inks in order to form the printed package or label.

The following examples are illustrative of the invention but it is understood that the invention is not limited thereto.

EXAMPLE 1

A water dispersible copolyester containing on the acid side approximately 90 mole percent isophthalic, and 10 mole percent of the sodium salt of 5-sulfoisophthalic, and on the glycol side 100 mole percent ethylene glycol was prepared by the following procedure.

A 2-liter, stainless steel reaction flask, equipped with an anchor stirrer, a thermocouple to measure the temperature of the vessel contents, an 18-inch Claisen/Vigreaux distillation column with a condenser and a receiver flask, an inlet port, and a heating mantle was preheated to 190° C., swept with nitrogen, and charged with 1065.6 g of dimethyl isophthalate, 180.6 g of dimethyl-5-sulfoisophthalate-sodium salt and 756.9 g of ethylene glycol. A buffer ($Na_2CO_3.10\ H_2O$ - 0.439 g) and a transesterification catalyst ($Mn\ (OAc)_2.4\ H_2O$ - 0.563 g) were added. The mixture was stirred and heated while methanol distilled from the flask. During the distillation, the vessel temperature was gradually raised to 250° C. When the weight of distillate was the same as the theoretical methanol yield, an ethylene glycol solution containing 0.188 g of phosphorus acid was added. The distillation column was replaced with a gooseneck vapor takeoff with a receiver. Ethylene carbonate (20 g) was added (neat) to the reaction mixture, and vigorous off-gassing ($CO_2$) started immediately. The $CO_2$ evolution subsided after about 10 minutes. A 240 mm Hg vacuum was applied, and the polycondensation catalyst (0.563 g $Sb_2\ O_3$ in an ethylene glycol slurry) was added. The mixture was stirred under 240 mm Hg vacuum for 10 minutes, after which the pressure was reduced from 240 mm Hg to 20 mm Hg in 10 mm Hg/minute increments. With the system at 20 mm Hg vacuum, the vessel temperature was raised from 250° C. to 290° C., at a rate of 2° C./minute. When the vessel temperature reached 290° C., the stirrer speed was reduced, and the pressure was lowered to 0.1 mm Hg or less. At that point a stirrer motor ammeter reading was obtained. The viscosity of the polymer was controlled by allowing the polycondensation to proceed to fixed values for the change in stirrer motor amps (A) of 2.3 amps. After the desired molecular weight was attained, nitrogen was used to pressurize the vessel and to force the molten polymer out of the bottom plug of the vessel into an ice water quench bath.

An aqueous dispersion of the copolyester prepared in accordance with Example 1 was made by adding 60 g of the copolyester in granular form to one liter of water maintained at about 90° C. in a two liter stainless steel vessel under conditions of vigorous agitation. After the copolyester was completely dispersed, it was cooled to room temperature, filtered, after which 11.2 g of a 50% solids aqueous dispersion of colloidal silica was added under mixing conditions. This dispersion of Example 1 was applied as a primer to polyester film by the following procedure:

EXAMPLE 2

Polyethylene terephthalate polymer was melted and extruded through a slot die onto a casting drum maintained at a temperature of about 20° C. The melt froze to form a cast sheet. The cast sheet was longitudinally stretched at a draw ratio of approximately 3.6:1 while maintained at a temperature of about 80° C.

The longitudinally drawn film was corona treated by a corona discharge apparatus and thereinafter coated with the copolyester dispersion prepared in accordance with Example 1 above by reverse gravure coating.

The corona treated, longitudinally drawn, coated film was dried at a temperature of about 100° C. Thereafter, the film was stretched in the transverse direction at a draw ratio of 3.6:1 to produce a biaxially drawn film having a thickness of about 3 mil. The biaxially drawn film was heat set at a temperature of 230° C. The dry weight of the coating was about 0.030 g/m$^2$ with a coating thickness of about $1 \times 10^{-6}$ inch.

Two samples of the one-side coated film thus produced were placed in a twelve inch laboratory vacuum coater such that opposite sides of the film would be metallized simultaneously. The vacuum chamber was evacuated to better than $10^{-4}$ torr and approximately 500 Angstroms of aluminum was evaporated onto both the uncoated and coated samples from a tungsten filament.

Within 30 seconds after removal from the vacuum chamber, each sample was tested for metal "rub-off" by lightly rubbing the metal surface with a cotton swab using the same number of rubs and approximately the same pressure for each sample tested. The "rub-off" characteristics of the coated film were ranked from 1 to 10, 1 being "no improvement" compared to uncoated polyester film, 10 being no "rub-off" at all. The results are summarized in Table I. Control uncoated polyester film ranks as 1 in the rub-off test.

EXAMPLE 3-7

In the same manner as set forth in Example 2, five additional copolyesters having compositions within the scope of this invention as set forth in Table I and synthesized by essentially the same procedure as set forth in Example 1 were coated onto the polyethylene terephthalate sheets. The sheets were prepared, metallized and tested in the same manner as set forth in Example 2 and the results are summarized in Table I.

EXAMPLE 8-17

Ten additional comparison copolyesters having compositions outside of the scope of this invention as set forth in Table I were coated onto the polyethylene terephthalate sheets, which were prepared, metallized and tested in the same manner as set forth in Example 2. These test results are also summarized in Table I.

TABLE I

| Example | METAL ADHESION DATA FOR COATING | | | | | | | | | | | | | | | |
|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 |
| METAL ADHESION[1] | 9 | 7 | 5 | 5 | 5 | 5 | 1 | 1 | 1 | 3 | 3 | 1 | 1 | 3 | 3 | 3 |
| COMPOSITION | | | | | | | | | | | | | | | | |
| Mole % Terephthalate[2] | 0 | 0 | 0 | 0 | 0 | 0 | 70 | 40 | 70 | 70 | 70 | 73 | 73 | 30 | 47 | 0 |
| Mole % Isophthalate | 90 | 80 | 70 | 70 | 80 | 70 | 20 | 0 | 0 | 0 | 0 | 0 | 0 | 60 | 23 | 45 |
| Mole % Adipate | 0 | 0 | 20 | 0 | 10 | 0 | 0 | 20 | 0 | 0 | 0 | 20 | 0 | 0 | 20 | 0 |
| Mole % Malonate | 0 | 0 | 0 | 20 | 0 | 0 | 0 | 0 | 20 | 0 | 0 | 0 | 0 | 0 | 0 | 45 |
| Mole % SIPA[3] | 10 | 10 | 10 | 10 | 10 | 10 | 10 | 40 | 10 | 10 | 10 | 7 | 7 | 10 | 10 | 10 |
| Mole % Succinate | 0 | 0 | 0 | 0 | 0 | 0 | 0 | 20 | 0 | 0 | 0 | 0 | 0 | 0 | 0 | 0 |
| Mole % Azelate | 0 | 0 | 0 | 0 | 0 | 0 | 0 | 0 | 0 | 0 | 20 | 0 | 0 | 0 | 0 | 0 |
| Mole % Sebacate | 0 | 10 | 0 | 0 | 0 | 20 | 0 | 0 | 0 | 0 | 0 | 0 | 0 | 0 | 0 | 0 |
| Mole % Glutarate | 0 | 0 | 0 | 0 | 0 | 0 | 0 | 0 | 0 | 0 | 0 | 0 | 20 | 0 | 0 | 0 |
| Mole % Ethylene Glycol | 100 | 100 | 100 | 100 | 100 | 100 | 100 | 100 | 100 | 100 | 100 | 100 | 100 | 100 | 100 | 100 |

Notes:
[1]Metal "Rub off" (Rating of 1 is equivalent to uncoated PET; Rating of 10 is no rub off)
[2]All acids present as the dimethyl ester.
[3]SIPA = dimethyl-5-sulfoisophthalate, sodium salt.

As can be readily seen from Table I, film coated with various copolyesters formulated within the parameters set forth herein exhibit significant improvement in metal adhesion properties as compared with uncoated polyesters film (the control) and with certain other copolyester formulations outside the scope of such parameters. For purposes of this invention, coated films exhibiting adhesion test results of 3 or less are considered to be outside the scope of the invention.

EXAMPLE 18

Copolyesters having the same composition as those of Examples 2-7 were coated off-line on the following materials:
1. Biaxially oriented nylon
2. Biaxially oriented polypropylene
3. Cast low density polyethylene
4. Biaxially oriented polyethylene terephthalate
5. Injected molded polyacetal
6. Biaxially oriented polycarbonate.

After coating, the materials, taped to cardboard supports, were dried in a forced air oven at 100° C. for 10 minutes. After drying, the coated materials, were then coated with approximately 500 angstroms of aluminum by vacuum evaporation.

The metal adhesion to both the "primed" and "unprimed" samples was evaluated by rubbing the metallized surface with a cotton swab using the same number of rubs and approximately the same pressure for each sample tested. The metal was easily removed from all of the unprimed samples while the primed samples required significantly more rubbing pressure (to the point of scratching the sample) before metal could be removed. It can be seen, therefore, that the base film materials used in this example are also suitable for metallization by the techniques herein set forth.

We claim:

1. An oriented self-supporting plastic film having a continuous copolyester polymeric coating on one or both sides thereof, said film prepared by melt extruding a substantially amorphous plastic film and thereafter orienting the film by stretching in one or two directions and heat setting the film, said copolyester coating being applied to said film as an aqueous dispersion prior to stretching in one direction or subsequent to stretching in one direction but prior to stretching in two directions, said copolyester coating consisting essentially of the polyester condensation product of the following monomers or their polyester forming equivalents:
   (A) about 65 to 95 mole percent of isophthalic acid;
   (B) about 0 to 30 mole percent of at least one aliphatic dicarboxylic acid of the formula $HOOC(CH_2)_nCOOH$, wherein n ranges from about 1–11;
   (C) about 5 to about 15 mole percent of at least one sulfomonomer containing an alkali metal sulfonate group attached to a dicarboxylic aromatic nucleus; and
   (D) stoichiometric quantities of about 100 mole percent of at least one copolymerizable aliphatic or cycloaliphatic alkylene glycol having about from 2 to 11 carbon atoms,
said film exhibiting improved adhesion to a metal coating applied by vapor deposition techniques onto one or both of said copolyester coated sides.

2. The film of claim 1 wherein said copolyester coating has a dry thickness within the range of about $10^{-7}$ to about $10^{-5}$ inch.

3. A metallized film comprising the film of claim 2 having a metal or metal oxide applied onto a copolyester coated side.

4. The film of claim 2 wherein said plastic film is selected from the group consisting of biaxially oriented nylon, biaxially oriented polypropylene, biaxially oriented polyethylene terephthalate and biaxially oriented polycarbonate.

5. The film of claim 4 wherein said plastic film is biaxially oriented polyethylene terephthalate film.

6. The film of claim 5 wherein said component C is present at a level of from about 6.5 to about 12 mole percent and is selected from the group consisting of sodium sulfoterephthalic acid, sodium 5-sulfoisophthalic acid, sodium sulfophthalic acid, 5-(p-sodiosulfophenoxy)-isophthalic acid, 5-(sulfopropoxy) isophthalic acid, sodium salt; and their polyester forming equivalents.

7. The film of claim 5 wherein said copolyester coating consists essentially of the copolyester condensation product of about 90 mole percent of isophthalic acid, about 10 mole percent of 5-sulfoisophthalic acid, sodium salt, or their polyester forming equivalents, and about 100 mole percent of ethylene glycol.

8. The film of claim 5 wherein said component B is present at a level of at least about one mole percent.

9. The film of claim 8 wherein said aliphatic dicarboxylic acid is sebacic acid.

10. The film of claim 5 wherein the copolyester coating consists essentially of the polyester condensation product of about 65 to about 95 mole percent of isophthalic acid; about 0 to about 30 mole percent of sebacic acid; about 5 to about 15 mole percent of the component C sulfomonomer, or their polyester forming equivalents, and about 100 mole percent of said glycol.

11. The film of claim 10 wherein said alkylene glycol is ethylene glycol.

12. The film of claim 11 wherein compound C is dimethyl-5-sulfoisophthalate, sodium salt.

13. The film of claim 11 wherein said copolyester coating has a dry thickness within the range of about $8.0 \times 10^{-7}$ to about $2.0 \times 10^{-5}$ inch.

14. The film of claim 13 wherein the acids A, B and C are employed as the lower alkyl diesters.

15. The film of claim 14 wherein said sebacic acid is present at a level of at least about one mole percent.

16. A metallized film comprising the film of claim 5 having a metal or metal oxide applied onto a copolyester coated side.

17. The metallized film of claim 16 wherein the metal is applied by a vacuum deposition technique.

18. The metallized film of claim 17 wherein the metal applied thereto is selected from the group consisting of zinc, nickel, silver, copper, gold, indium, tin, stainless steel, chromium, titanium and aluminum.

19. The metallized film of claim 18 wherein the metal applied thereto is aluminum.

20. A metallized film comprising a base of plastic material, a primer coating applied to one or both sides of said base material at a dry weight thickness within the range of about $10^{-7}$ to about $10^{-5}$ inch, said coating consisting essentially of the polyester condensation product of the following monomers or their polyester forming equivalents:
   (A) about 65 to 95 mole percent of isophthalic acid;
   (B) about 0 to 30 mole percent of at least one aliphatic dicarboxylic acid of the formula $HOOC(CH_2)_nCOOH$, wherein n ranges from about 1–11;
   (C) about 5 to about 15 mole percent of at least one sulfomonomer containing an alkali metal sulfonate group attached to a dicarboxylic aromatic nucleus, and
   (D) stoichiometric quantities of about 100 mole percent of at least one copolymerizable aliphatic or cycloaliphatic alkylene glycol having about from 2 to 11 carbon atoms,
      said film having a metal coating applied by vacuum deposition techniques onto one or both of said coated sides, the thickness of said metal coating ranging from about 25 to 2000 angstroms.

21. The film of claim 20 wherein said plastic material is elected from the group consisting of biaxially oriented nylon, biaxially oriented polypropylene, cast low density polyethylene, biaxially oriented polyethylene terephthalate, injection molded polyacetal and biaxially oriented polycarbonate.

22. The film of claim 21 wherein said plastic material is biaxially oriented polyethylene terephthalate.

23. The film of claim 22 wherein said metal is aluminum.

24. The film of claim 22 wherein said coating consists essentially of the copolyester condensation product of about 90 mole percent of isophthalic acid, about 10 mole percent of 5-sulfoisophthalic acid, sodium salt, or their polyester forming equivalents, and about 100 mole percent of ethylene glycol.

25. The film of claim 22 containing at least one mole percent of said component B.

26. The film of claim 25 wherein said component B is sebacic acid.

* * * * *